Figure 1:
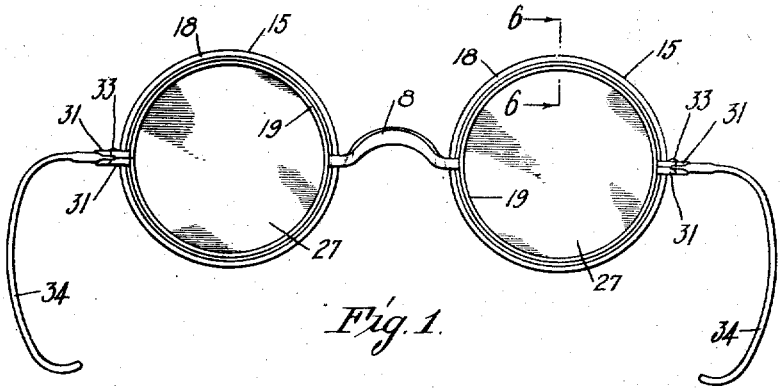

Dec. 22, 1925.

Re. 16,232

F. A. STEVENS

OPHTHALMIC MOUNTING

Original Filed Dec. 3, 1918

Inventor;
Frederick A. Stevens.
By David Rines
Attorney;

Reissued Dec. 22, 1925. Re. 16,232

UNITED STATES PATENT OFFICE.

FREDERICK A. STEVENS, OF PROVIDENCE, RHODE ISLAND, ASSIGNOR, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Original No. 1,293,232, dated February 4, 1919, Serial No. 265,139, filed December 3, 1918. Application for reissue filed May 17, 1920. Serial No. 382,122.

*To all whom it may concern:*

Be it known that I, FREDERICK A. STEVENS, a citizen of the United States, residing at Providence, in the county of Providence and State of Rhode Island, have invented certain new and useful Improvements in Ophthalmic Mountings, of which the following is a specification.

My invention relates to that class of mountings in which an auxiliary rim is employed.

The principal objects of my invention are to provide an inexpensive and efficient means for assembling the auxiliary rim to the skeleton rim and for securely retaining the assembled parts while in use; and to attain these ends in a non-expensive structure.

To the above ends essentially my invention consists of such parts and combinations of parts as fall within the scope of the appended claims.

Figure 2:
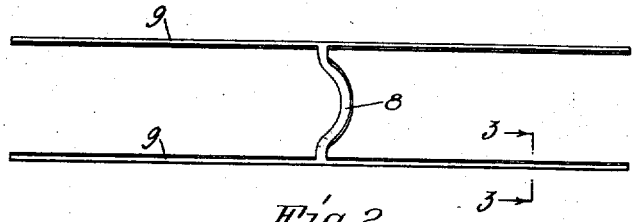
Figure 3:
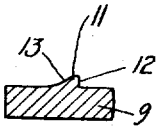
Figure 4:
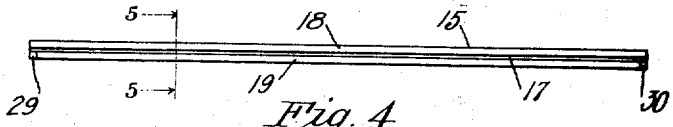
Figure 5:
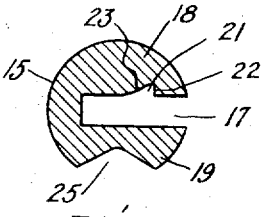
Figure 6:
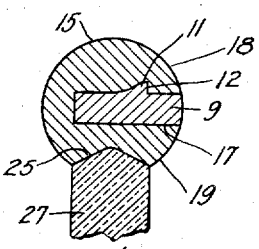

In the accompanying drawings which form a part of this invention, and wherein like reference characters indicate like parts throughout the views;

Figure 1 is a rear elevation of a pair of spectacles embodying my invention,

Fig. 2, a plan view of the original spectacle skeleton,

Fig. 3, an enlarged section on line 3—3 of Fig. 2,

Fig. 4, a rear elevation of an auxiliary rim before bending,

Fig. 5, a section on line 5—5 of Fig. 4,

Fig. 6, a section on line 6—6 of Fig. 1, and

Figure 7:
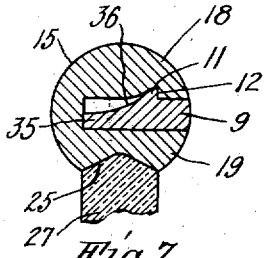

Fig. 7, a similar section showing a modified form of eye wire best adapted for eyeglasses.

My invention in its illustrated embodiment is applied to a spectacle frame. The skeleton of the latter comprises the bridge 8 fast to the central portions of the wires 9 which are intended for subsequent bending into circular rims. This stage of construction is shown in Fig. 2. The wires 9 are substantially flat or oblong in cross section. Each wire is provided intermediate its width on one face with a longitudinal rib 11 preferably acute angular in cross section. One face 12 of the rib is vertical, and the other face 13 is inclined.

In constructing spectacles the rims are first applied to the wires. The rims, in the present instance consisting of two sections 15, are preferably composed of zylonite, celluloid, or other non-metallic material. One such section is shown in Fig. 4. This is provided in its rear side with a longitudinally disposed rectangular oblong slot 17 extending beyond the center of the rim through a major portion of its thickness or depth dividing the rim into wings or sections 18 and 19. Extending into the wing 18 from the slot 17 is an annular recess 21, angular in cross section, bounded by a vertical wall or face 22 and an inclined wall 23. In the outer face of the wing or tongue 19 is an annular groove 25, preferably V shaped in cross section.

The wires 9 and rims 15 are bent into circular form before receiving the lenses 27, whose margins enter the grooves 25. Each section 15 has notches 29 and 30 at the ends of the wing 19 to accommodate end pieces 31 soldered or otherwise fixed to the ends of the wires 9. The end pieces 31 are attached together by screws or pins 33; and the temples 34 are connected as usual.

The parts are assembled, after the rims and wires have been bent into circular form, thus. Each annular metallic rim 9 is inserted edgewise or laterally into the annular slot 17 of the annular rim. By reason of its resiliency, the section 19 is adapted to yield sufficiently to permit the rib 11, which is being forced into the slot, to pass into its recess seat 21; whereupon the section 19 returns to its natural position. The cross section of the slot 17 is substantially the same as that of the wires 9, so that the metallic rim that is seated in the slot occupies substantially all the space of the slot. The inclined face 13 of the rib 11 facilitates introduction of the wire, while the face 12 tends to prevent separation of the rims, the faces 12 and 22 coacting to lock the rims together.

Introduction may be facilitated by shaping the wire 9 as shown in Fig. 7. That is, one lateral margin is reduced, as at 35, so that its inclined upper surface 36 merges into the surface 13.

According to my invention, therefore, the use of screws, clips or other additional means for securing the rims together in locked relationship is done away with, and the necessity for either swaging the metal to conform to the shape of the non-metallic rim or of pressing the non-metallic material into firm contact with the metallic rim is entirely eliminated. As, therefore, neither the metal nor the non-metallic material is subjected to permanent strain as a result of the assembling operation, there is no tendency for the non-metallic material to shrink away from the metal rim, so that if the non-metallic rim is originally cured to the proper degree before the rims are assembled, it will remain in place upon the metallic rim, exactly in position as originally mounted thereon. A very efficient and attractive ophthalmic mounting is thus provided.

The foregoing description is directed solely toward the construction illustrated, but I reserve the privilege of resorting to all the mechanical changes to which the device is susceptible, the invention being defined and limited only by the terms of the appended claims.

I claim,

1. In an ophthalmic mounting, the combination of a rim provided with an annular slot extending transversely of the rim, and with an internal annular recess opening into the slot, and with an external annular groove adapted to receive a lens, a rim seated in the slot, and a rib of the second rim registering in the recess.

2. In an ophthalmic mounting, the combination of a nonmetallic rim provided with an annular slot extending transversely of the rim, and with an internal recess opening into the slot, and with an external groove, a lens seated in the groove, a metallic rim seated in the slot, and a rib on the metallic rim registering in the recess.

3. In an ophthalmic mounting, the combination of a nonmetallic rim provided with an annular slot extending transversely of the rim a major portion of its depth, and with an annular recess acuate angular in cross section opening into the slot, and with an external annular groove, a rim seated in the slot, a lens in the groove, and an annular acute angular rib on the second rim registering in the recess.

4. An opthalmic mounting, having, in combination, a rim provided with an annular slot so as to be visible at the opening of the slot only, a second rim enclosed within the slot, and means for locking the rims together, one of the rims being constituted of resilient material and adapted to yield when the second rim is forced into the slot to permit the locking means to become effective.

5. An opthalmic mounting having, in combination, a rim provided with an annular slot and a second rim enclosed within the slot so as to be visible at the opening of the slot only, one of the rims having a recess and the other rim having a rib seated within the recess to lock the rims together, one of the rims being constituted of resilient material and adapted to yield when the second rim is forced into the slot to permit the rib to become seated within the recess.

6. An ophthalmic mounting having, in combination, a rim provided with an annular slot, and a second rim enclosed within and occupying substantially all the space of the slot so as to be visible at the opening of the slot only, one of the rims having an annular recess and the other rim having an annular rib seated within the recess to lock the rims together, one of the rims being constituted of resilient material and adapted to yield when the second rim is forced into the slot to permit the rib to become seated in the recess.

7. An ophthalmic mounting having, in combination, a rim constituted of resilient, material provided with an annular slot dividing the rim into resilient wings, and a second rim enclosed within the slot so as to be visible at the opening of the slot only, one of the rims having a recess and the other rim having a rib seated within the recess to lock the rims together, one of the resilient wings being adapted to yield when the second rim is forced into the slot to permit the rib to become seated within the recess.

8. An ophthalmic mounting having, in combination, a rim constituted of resilient non-metallic material provided with an annular slot substantially oblong in cross section dividing the rim into resilient wings, and a metallic rim substantially oblong in cross section seated within, and occupying substantially all the space of, the slot, one of the rims having a recess and the other rim having a rib seated within the recess to lock the rims together, one of the resilient wings being adapted to yield when the metallic rim is forced into the slot to permit the rib to become seated within the recess.

9. An ophthalmic mounting having, in combination, a rim constituted of resilient, non-metallic material provided with an annular slot dividing the rim into resilient wings, and a metallic rim enclosed within the slot so as to be visible at the opening of the slot only, one of the rims having an annular recess adjacent to an interior wall of the slot and the other rim having an annular rib seated within the recess to lock the rims together, one of the resilient wings being adapted to yield when the second rim is forced into the slot to permit the rib to become seated within the recess.

10. An ophthalmic mounting having, in combination, a rim provided with an annular slot, and a second rim enclosed within the slot so as to be visible at the opening of the slot only, one of the rims having a recess and the other rim having a rib provided with an inclined face seated within the recess to lock the rims together, one of the rims being constituted of resilient material and adapted to yield to permit the rib to become seated within the recess when the inclined face upon one of the rims is engaged by the other rim during the forcing of the second rim into the slot.

11. The method of making a frame which comprises providing a resilient rim with an annular slot, providing a second rim adapted to be enclosed within the slot so as to be visible at the opening of the slot only, providing a recess upon one of the rims, providing a rib adapted to be seated within the recess upon the other rim, and forcing the second rim into the slot, the first-named rim being adapted to yield to permit the rib to become seated within the recess.

12. The method of making an ophthalmic mounting which comprises providing a non-metallic, resilient rim with an annular slot dividing the rim into resilient wings, providing a metallic rim adapted to be enclosed within the slot so as to be visible at the opening of the slot only, providing an annular recess upon one of the rims, providing an annular rib adapted to be seated within the recess upon the other rim, the recess and the rib being disposed adjacent to an interior wall of the slot when the rims are assembled, and forcing the metallic rim into the slot, one of the wings being adapted to yield to permit the rib to become seated within the recess.

13. In an ophthalmic mounting, the combination of a non-metallic rim provided with an annular slot extending transversely a major portion of the thickness of the rim, and with an internal annular recess opening into the slot, and with an external annular groove adapted to embrace a lens, a metallic rim seated in the slot, and an annular rib on the second rim registering in the recess.

14. An ophthalmic mounting having, in combination, a non-metallic rim provided with an annular slot substantially oblong in cross section and extending through a major portion of the thickness of the rim, and a metallic rim substantially oblong in cross section seated within, and occupying substantially all the space of, the slot, one of the rims having an annular recess adjacent to an interior wall of the slot and the other rim having an annular rib seated within the recess to lock the rims together.

15. An ophthalmic mounting having, in combination, a rim provided with an annular slot extending transversely of the rim and a second rim seated within the slot, one of the rims having a recess and the other rim having a rib seated within the recess to lock the rims together.

16. An ophthalmic mounting having, in combination, a rim provided with an annular slot extending transversely of the rim, and a second rim seated within the slot, one of the rims having an annular recess adjacent to an interior wall of the slot and the other rim having an annular rib seated within the recess to lock the rims together.

17. An ophthalmic mounting having, in combination, a non-metallic rim provided with an annular slot extending transversely of the rim and a metallic rim seated within the slot, the non-metallic rim having an annular press extending inwardly from a wall of the slot and the metallic rim having an annular rib seated within the recess to lock the rims together.

18. An ophthalmic mounting having, in combination, a non-metallic rim provided with an annular slot, and a metallic rim enclosed within the slot so as to be visible at the opening of the slot only, one of the rims having a recess and the other rim having a rib seated within the recess to lock the rims together.

19. An ophthalmic mounting having, in combination, a non-metallic rim provided with an annular slot extending through a major portion of the thickness of the rim and with a lens-receiving groove, and a metallic rim enclosed within the slot so as to be visible at the opening of the slot only, one of the rims having a recess and the other rim having a rib seated within the recess to lock the rims together.

20. An ophthalmic mounting having, in combination, a rim provided with an annular slot dividing the rim into wings, and a second rim inserted edgewise into the slot, the cross section of the second rim being substantially the same as the cross section of the slot and the distance between the free edges of the slot being greater than the thickness of a lateral margin of the second rim to facilitate the insertion of the second rim into the slot.

21. In an ophthalmic mounting, the combination of an auxiliary non-metallic rim comprising an outer peripheral portion, and a resilient inner tongue portion provided in its inner periphery with a groove, and with an annular lateral slot between the peripheral portion and the tongue portion, and a lens in the groove.

22. An ophthalmic mounting having, in combination, a split rim constituted of resilient material having annular wings forming between them an annular slot, the wings having portions located comparatively far from the body of the rim that are nearer together than other portions located comparatively near to the body of the rim, and a second rim seated in the slot, the surface of the second rim being shaped to conform to the slot, whereby the nearer-together portions of the wings engage the second rim to hold the rims against separation, the winged rim being initially, prior to its assembly with the second rim, constructed to retain its shape.

23. The method of making an ophthalmic mounting that comprises providing a rim constituted of resilient material having annular wings forming between them an annular slot, the wings having portions located comparatively far from the body of the rim that are nearer together than other portions located comparatively near to the body of the rim, providing a rim that is adapted to be seated in the slot and the surface of which is shaped to conform to the slot, temporarily resiliently separating the wings to temporarily open out the distance between the said nearer-together portions of the wings, and introducing the second rim into the slot and by way of the said opened-out portions of the wings.

24. The method of making an ophthalmic mounting that comprises longitudinally slotting a rod constituted of resilient, nonmetallic material to produce annular wings on each side of the slot, providing a second rim adapted to be enclosed within the slot so as to be visible at the opening of the slot only, temporarily resiliently separating the portions of the wings near the mouth of the slot, introducing the second rim into the slot by way of the separated portions, and permitting the separated portions of the wings to spring back into normal position to engage the second rim and hold the rims together.

In testimony whereof, I have hereunto subscribed my name this 10th day of May, 1920.

FREDERICK A. STEVENS.